US010150483B2

(12) United States Patent
Procuniar et al.

(10) Patent No.: US 10,150,483 B2
(45) Date of Patent: Dec. 11, 2018

(54) SETTINGS MANAGER—DISTRIBUTED MANAGEMENT OF EQUIPMENT AND DISPLAY SETTINGS VIA CENTRALIZED SOFTWARE APPLICATION

(71) Applicant: Deere & Company, Moline, IL (US)

(72) Inventors: Steven R. Procuniar, Urbandale, IA (US); Peter J. Jensen, West Des Moines, IA (US); Benjamin Neermann, Mannheim (DE); Sarah L. Schinckel, Ankeny, IA (US); Jeffrey R. Fox, Minburn, IA (US); Sean McKay, Coralville, IA (US); Margaux M. Price, Waukee, IA (US); Robert J. Meegan, Urbandale, IA (US); Hans Juergen Nissen, Zweibruecken (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/251,318

(22) Filed: Aug. 30, 2016

(65) Prior Publication Data
US 2018/0057017 A1   Mar. 1, 2018

(51) Int. Cl.
B60W 50/08      (2012.01)
A01B 76/00      (2006.01)
H04L 12/24      (2006.01)
G05B 13/04      (2006.01)
G06Q 10/08      (2012.01)
B60W 50/00      (2006.01)
H04L 29/08      (2006.01)
H04L 29/06      (2006.01)

(52) U.S. Cl.
CPC .......... *B60W 50/085* (2013.01); *A01B 76/00* (2013.01); *G05B 13/042* (2013.01); *G06Q 10/08* (2013.01);
(Continued)

(58) Field of Classification Search
None
See application file for complete search history.

(56) References Cited

U.S. PATENT DOCUMENTS 6,542,789 B2 *   4/2003   Ufheil .................... G05B 19/04
                                                                    700/275
7,170,400 B2     1/2007   Cowelchuk et al.
(Continued)

FOREIGN PATENT DOCUMENTS

EP    2151355 A1    2/2010
EP    1714847 B2    12/2013
(Continued)

OTHER PUBLICATIONS

Extended European Search Report for European Patent Application No. 17191346.0 dated Feb. 12, 2018.

*Primary Examiner* — Redhwan K Mawari
*Assistant Examiner* — Edward Torchinsky
(74) *Attorney, Agent, or Firm* — Harness, Dickey & Pierce, P.L.C.

(57) ABSTRACT

A method and system for managing settings on a single vehicle/implement system and across a fleet of vehicle/implement systems. Each vehicle/implement system includes a plurality of Embedded Systems having configurable settings, a Precision Agriculture Server having configurable settings, and a Telematics Server having configurable settings. All of the servers are connected by a plurality of vehicle data busses. The Telematics Server is connected to Cloud-Based Servers via the Internet. Vehicle/implement system settings are managed by the Precision Ag Server and shared with other vehicle/implement systems via the Cloud-based Server. Flexibility for different vehicle/implement models and options is provided by a distributed system using Client Software in the Precision Ag Server or Client Software in the Embedded Systems and by a settings identification and versioning schema.

11 Claims, 14 Drawing Sheets

(52) U.S. Cl.
CPC ...... *H04L 41/0806* (2013.01); *H04L 41/0823* (2013.01); *H04L 41/0853* (2013.01); *H04L 41/0856* (2013.01); *B60W 2050/0064* (2013.01); *B60W 2050/0065* (2013.01); *B60W 2050/0085* (2013.01); *B60W 2300/152* (2013.01); *H04L 67/12* (2013.01); *H04L 67/42* (2013.01)

(56) References Cited

U.S. PATENT DOCUMENTS

| | | | |
|---|---|---|---|
| 7,702,443 B2* | 4/2010 | Price | G06F 3/04847 701/36 |
| 7,756,623 B2 | 7/2010 | Jarrett et al. | |
| 8,847,936 B2 | 9/2014 | Chervenka et al. | |
| 9,104,537 B1 | 8/2015 | Penilla et al. | |
| 2003/0078709 A1* | 4/2003 | Yester | B60R 16/037 701/36 |
| 2013/0274925 A1* | 10/2013 | Oates, Jr. | E02F 3/96 700/275 |
| 2014/0343697 A1* | 11/2014 | Kuipers | B62D 6/008 700/85 |
| 2015/0057839 A1 | 2/2015 | Chang et al. | |
| 2015/0217777 A1 | 8/2015 | Konigsberg | |
| 2015/0217780 A1 | 8/2015 | Chen et al. | |

FOREIGN PATENT DOCUMENTS

| | | |
|---|---|---|
| EP | 2733680 A1 | 5/2014 |
| GB | 2496476 A | 5/2013 |

* cited by examiner

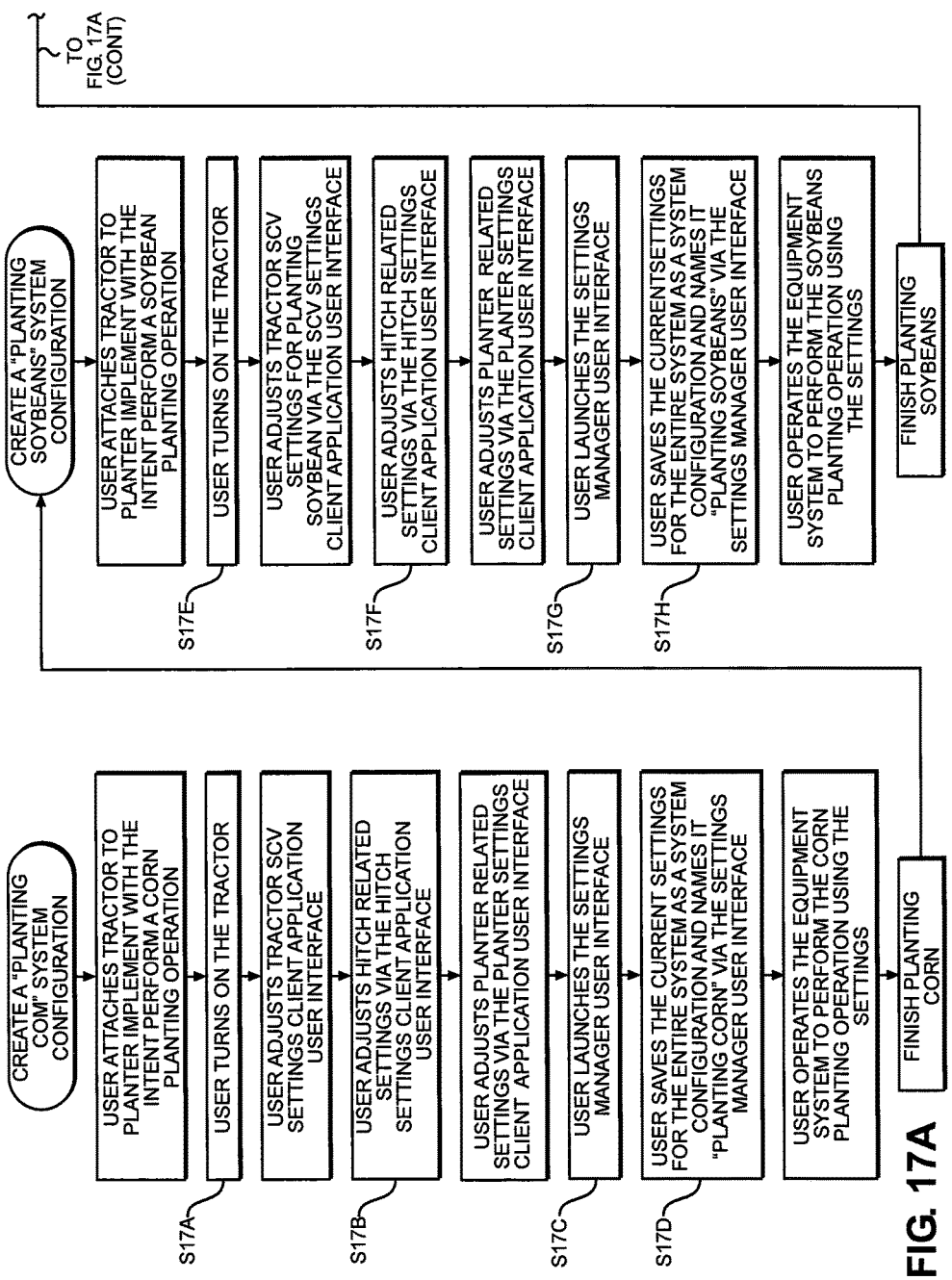

SETTINGS MANAGER—DISTRIBUTED MANAGEMENT OF EQUIPMENT AND DISPLAY SETTINGS VIA CENTRALIZED SOFTWARE APPLICATION

BACKGROUND

Field

One or more example embodiments relate to a method and system for managing configurable settings of implementable functions across a fleet of vehicles and related implementing systems.

Description of Related Art

Certain prior art work vehicles and implements, such as agricultural machines or other heavy equipment, tend to have many configurable settings which are used to improve the performance and efficiency of related vehicle/implement systems. Some of these settings need to be changed whenever something in the work environment changes. Optimizing these settings requires skill and knowledge. Failure to correctly set one or more of these settings may result in sub-optimal performance or worse. Furthermore, such vehicle/implement systems often vary by model, model year, and/or installed options.

SUMMARY

The methods and systems described herein provide improved methods and systems for managing configurable settings in such vehicle/implement systems. The described methods and systems are easily adaptable to variations in the vehicle/implement systems depending on at least on model, model year and/or installed options, and/or farming task (e.g. Planting Corn vs. Planting Soybeans). For example, when a farmer has need to plant different crops in different fields, the needed equipment and/or settings of the equipment may be changed accordingly.

In an example embodiment, a method and system is provided for managing configurable settings across a fleet of vehicles and implement systems. The systems and methods may utilize a plurality of Embedded Systems having configurable settings, one or more servers, such as a Precision Agriculture Server having configurable settings, and a Telematics Server having configurable settings. These components may be connected by a plurality of vehicle data busses. The Telematics Server may be connected to one or more Cloud-Based Servers via the Internet. Vehicle/implement system settings may be managed by the Precision Ag Server and shared with other vehicle/implement systems via the Cloud-based Servers. Flexibility for different vehicle/implement models and options may be provided by a distributed system using Client Software in the Precision Ag Server or Client Software in the Embedded Systems and by a settings identification and versioning schema. The Client Software may be responsible for saving, validating, and restoring the settings that it represents. Embedded Systems may store the most recently used settings in an internal non-volatile memory. The settings that are relevant to any one client can be referred to as the client's Settings Group.

Further areas of applicability will become apparent from the description provided herein. The description and specific examples in this summary are intended for purposes of illustration only and are not intended to limit the scope of the present disclosure.

BRIEF DESCRIPTION OF THE FIGURES

The subject matter of the present specification will now be explained in more detail using exemplary embodiments, which are not exclusive, and with reference to the attached drawings, in which.

DETAILED DESCRIPTION

Figure 1:
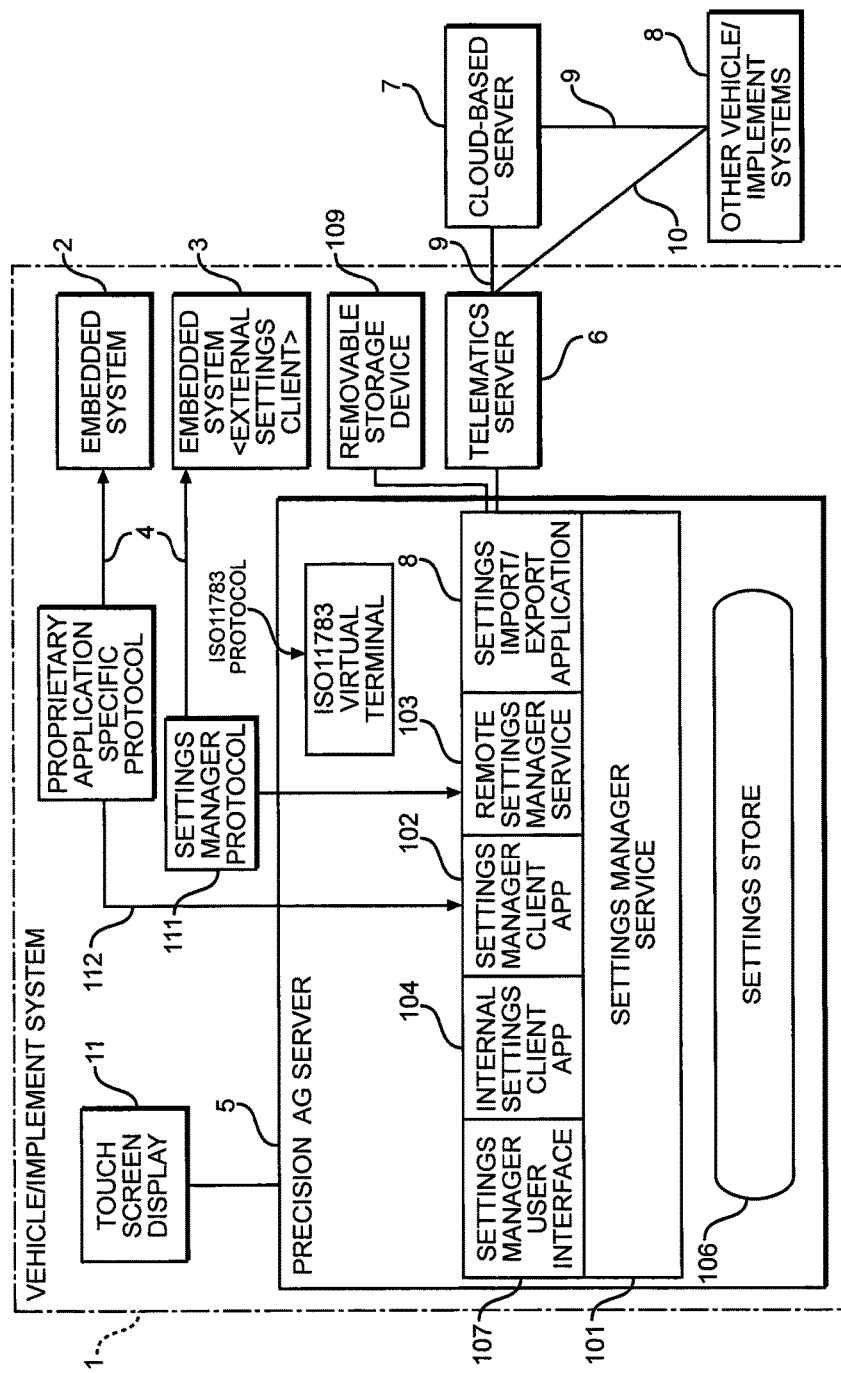
FIG. 1 is a block diagram of an example embodiment of a system for managing configurable settings across a fleet of vehicle and implement systems.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

FIG. 1 illustrates a vehicle/implement system 1 that includes electronic modules, software modules, or both. In an example embodiment, the vehicle/implement system supports storing, processing and/or execution of software instructions of one or more software modules.

FIG. 1 shows components of a system for saving, restoring, managing, and sharing configurable settings of computerized devices 2, 3, 5, 6 in vehicle/implement systems 1, 8. In an example embodiment, the vehicle/implement systems 1, 8 may be a representation of an agricultural machine (e.g. tractor, combine, sprayer, etc.) with optional implements and attachments (e.g. planter, tillage, header, loader, etc.) or other heavy equipment (e.g. crawler, loader, grader, etc.).

The vehicle/implement systems 1, 8 may include Embedded Systems 2, 3 that control various functionalities of the vehicle or implement (e.g. engine controller, transmission controller, hitch controller, planter row unit controller). These Embedded Systems 2, 3 have configurable settings that are used to optimize the functionality of the vehicle/implement systems 1, 8 for a given operating environment. The Embedded Systems 2, 3 have internal non-volatile memory that will retain data without power. Types of non-volatile memory may include, but are not limited to, EEPROM, and flash memory devices and are used to store the most recently used values of the configurable settings. In an example embodiment, the Embedded Systems 2, 3 are computer devices with CPU, memory, and I/O, connected via a network (typically, but not limited to, CAN). CAN is a networking technology common in vehicles. Embedded Systems 2, 3 may be physically distributed throughout the vehicle/implement system and connected via a network.

The vehicle/implement systems 1, 8 may also include a Precision Ag Server 5, located in the cab of a vehicle, that provides high level functionality such as, but not limited to, vehicle guidance, work documentation, section control, rate control, and a machine user interface display 11. At least some of these functions may also have configurable settings. The Precision Ag Server 5 also provides Settings Management functionality which will be described in detail later. The Precision Ag Server 5 is connected to the Touch Screen Display 11 that provides a user interface to the Vehicle/Implement System 1 end-user/operator.

The vehicle/implement systems 1, 8 may also include a Telematics Server 6 that provides wireless connectivity 9 to a cloud-based server 7, wireless machine-to-machine connectivity 10, and other telematics functionality (e.g. diagnostics, machine location, etc.). At least some of these functions may also have configurable settings.

Figure 16:
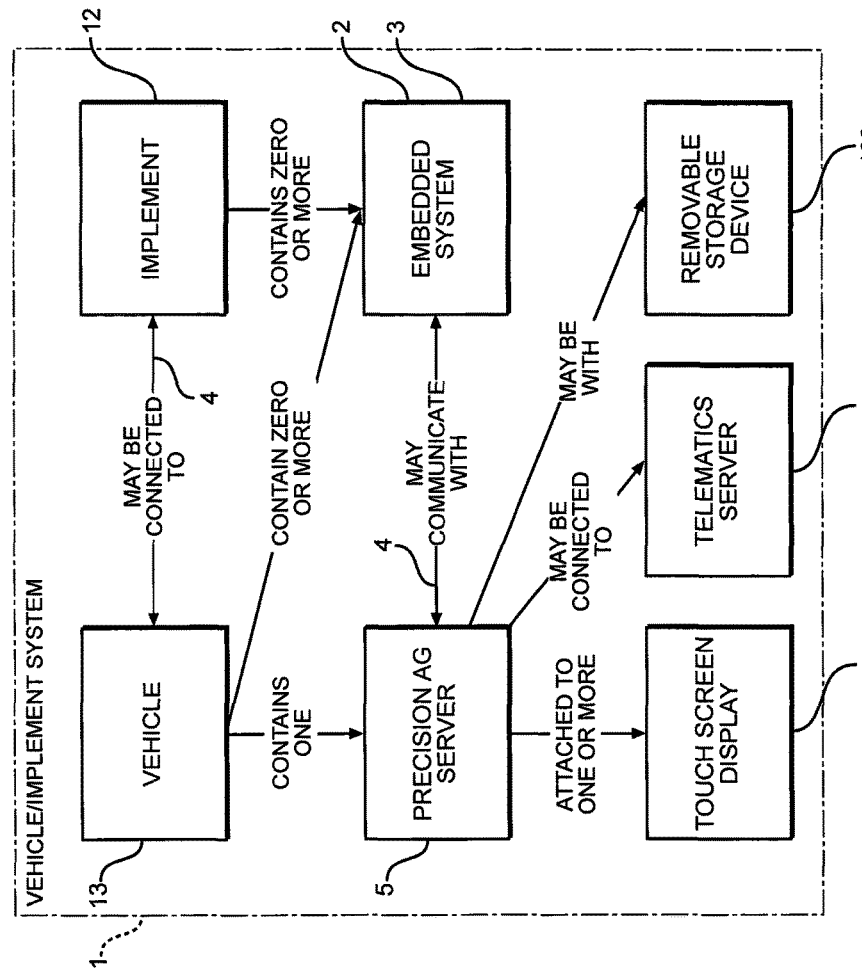
FIG. 16 shows an example interconnectivity of the Vehicle/Implement System of FIG. 1.

The afore mentioned computerized devices 2, 3, 5, 6 may be connected by one or more data communications busses 4 (FIG. 16). These busses may utilize various data communications technologies (e.g. CAN, Ethernet), but all serve the same basic purpose of allowing the devices to communicate with one another. The vehicle/implement system 1 may contain one vehicle and zero or more implements. Each vehicle or implement may have zero or more Embedded Systems physically attached where 2, 3, 5, and 6 are examples (see FIG. 16). Any reasonable (considering network technology limitations) number of Embedded Systems may be deployed on the system network. Any of the connected Embedded Systems may or may not participate in the Settings Manager Service 101 depending on the individual controller's needs.

FIG. 1 also illustrates software components that are deployed as native in memory applications to the Precision Ag Server 5 that are relevant to saving, restoring, managing, and sharing configurable settings (Settings Manager). The Settings Manager functionality is provided by a distributed system consisting of a Settings Manager Service 101, installable Settings Client Apps 102 stored in a memory of the Precision Ag Server 5, Internal Settings Client App 104 dedicated to managing configurable settings of the Precision Ag functionality, and the Embedded Systems with Settings Clients 3 that are connected to the Settings Manager Service 101 by the data communications bus 4 and the Remote Client Interface 103. The Remote Client Interface 103 is a software component of the Precision Ag Server 5 that is responsible for providing an interface between the Settings Manager Service 101 and the Embedded Systems with settings manager clients 3. This interface is implemented over the data communications bus 4. This distributed system approach allows new Settings Clients to be easily added to or removed from the system 1 to handle variations of machine model, model year, and optional equipment. The Settings Manager Service 101 and Settings Client Apps 102 are software components that are deployed to the Precision Ag Server 5. Internal Settings Client App(s) 104 is a type of Settings Client App that is dedicated to managing the configurable settings related to Precision Ag functionality.

The Settings Manager Service 101 communicates with Settings Client Apps 102, Precision Ag Settings Client 104, and the Embedded Systems with Settings Client 3 to identify and register all connected clients, collect configurable settings values to be saved, and distribute settings values to be restored. The Settings Manager Service 101 is also responsible for reading and writing settings to the Settings Store 106 and the Settings Import/Export component 108. The Settings Import/Export component 108 is a software component of the Precision Ag Server 5 that is responsible for providing an interface between the Settings Manager Service 101 and a removable storage device 109 or the Telematics Server 6. Collections of settings values can optionally be marked as Read-Only so that the collections of settings cannot be modified or deleted by the Vehicle/Implement System operator/end-user (e.g. default values). The Settings Manager Service 101 has no knowledge of the contents of the client's settings and treats them as collections of binary data stored as single entities ("Blobs").

Figure 15:
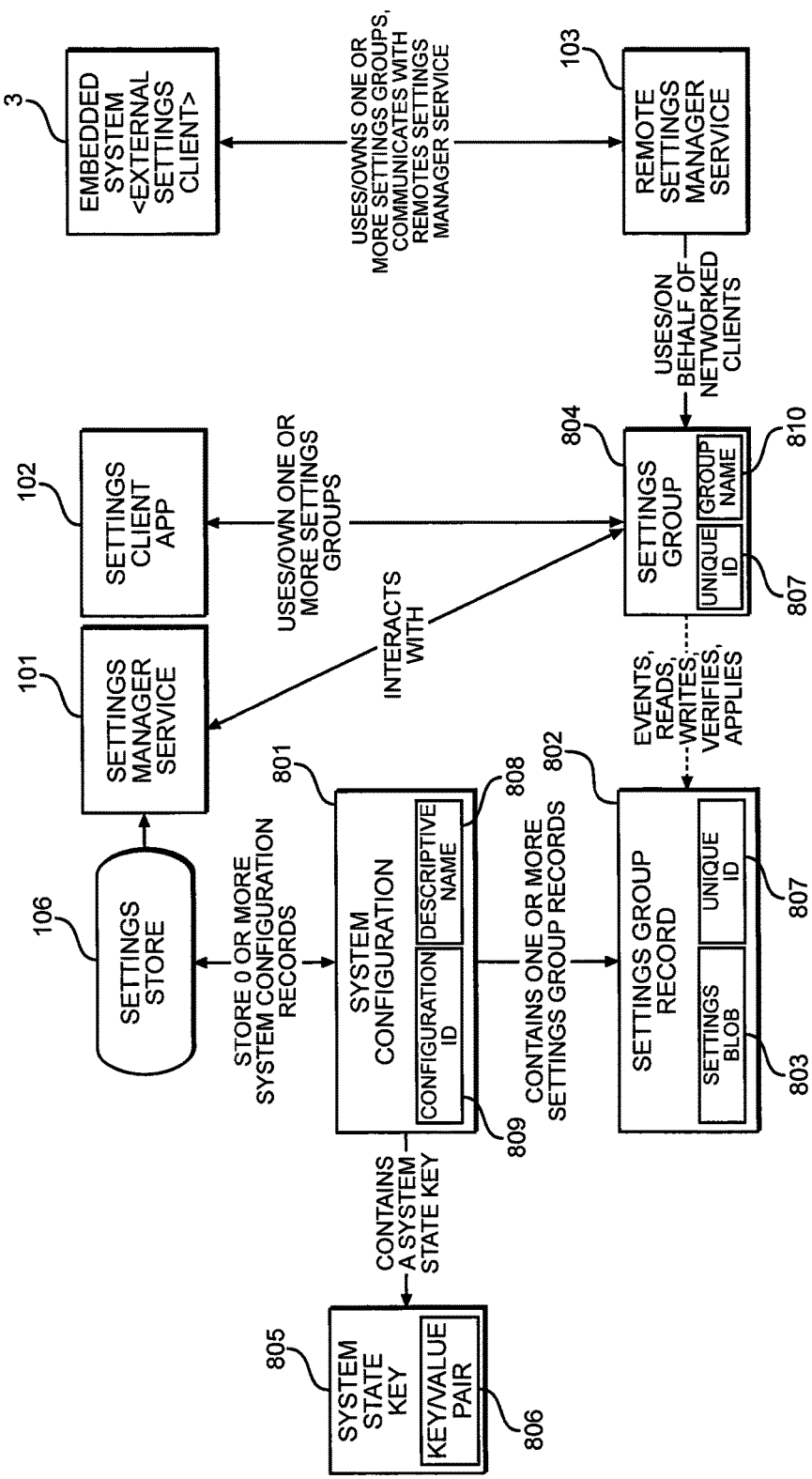
FIG. 15 shows an example interconnectivity of the Vehicle/Implement System of FIG. 1.

As shown in FIG. 15, the Settings Store 106 is a non-volatile storage mechanism that stores individual Settings Group settings as Settings Group Record(s) 802 that contain a binary Settings Blob 803 keyed on the unique Configuration Id 809 that corresponds to a System Configuration 801 record and a Unique ID 807 that corresponds to the Settings Group 810. The settings Store 106 will use the file system of the Precision Ag Server 5 to persist System Configuration(s) 801 through power cycles. A System State Key 805 is stored with each System Configuration 801. The System State Key 805 contains a set of Key/Value Pairs 806 where the set defines the state of the system at the time the System Configuration 801 was stored. Key/Value Pairs 806 are parameters provided by other Precision Ag Server 8 native software apps applications (e.g. vehicle SN, implement SN, crop type, conditions, etc.). The System State Key 805 can be used to filter or sort a list of System Configurations for selection based on the current state of the Vehicle/Implement System 1.

The Settings Manager User Interface 107 allows the user to control when settings values are saved, restored, deleted, or modified. The Settings Manager User Interface 107 is provided to the user via the Touch Screen Display 11 that is connected to the Precision Ag Server 5 (see FIGS. 8-14).

Settings Client Apps 102 communicate with Embedded Systems 2 and the Settings Manager Service 101 via the bus 4. The Settings Client Apps 102 contain data that represents the contents of the settings values, which Embedded System 2 settings values should be saved and restored, how to validate that settings being restored are compatible, how to verify that the current machine condition is appropriate for changing settings values, and optionally to provide a user interface to allow the user to preview settings to be restored.

The Embedded System 2 is part of a distributed sub-system that includes a Settings Client App 102. Settings Client App 102 is connected over the bus 4 to the Embedded System 2. The Embedded System 2 and Settings Client App 102 communicate via an Application Specific Protocol 112 that is specific to the function that the Embedded System 2 provides. The Settings Client App 102 is physically deployed on the Precision Ag Server 5. The Settings Client App 102 uses the Settings Manager Service 101 to access settings. The Settings Client App 102 communicates settings with the Embedded System 2 via the Application Specific Protocol 112 providing the Embedded System 2 with access to the Settings Manager Service's 101 capabilities.

The Remote Client Interface 103 communicates with the Embedded Systems with Settings Clients 3 and the Settings Manager Service 101 via the bus 4. The Embedded Systems with Settings Clients 3 provide similar functionality to the Settings Client Apps 102 in saving settings values, restoring settings values, validating compatibility with settings being restored, and verifying machine conditions are appropriate for changing settings.

The Embedded System with Settings Client 3 uses a Settings Manager Protocol 111 to communicate with the Remote Client Interface 103. The Remote Client Interface 103 acts as a proxy to the Settings Manager Service 101 by forwarding request and response messages from the Embedded System with Settings Client 3 to the Settings Manager Service 101. Thus the Settings Manager Protocol 111 is used to provide access to the Settings Manager Service 101 features without the need for an additionally deployed Settings Manager Client App 102.

The Precision Ag Settings Client 104 communicates with the Precision Ag and Display Apps on the Precision Ag Server 5 and with the Settings Manager Service 101. The Precision Ag Settings Client 104 provides similar functionality to the Settings Client Apps 102 in saving settings values, restoring settings values, validating compatibility with settings being restored, and verifying machine conditions are appropriate for changing settings. The Precision Ag Settings Client 104 is physically deployed on the Precision Ag Server 5. As a result, this type of client 104, may (or may not) need to communicate with any external devices to access and share settings.

The Settings Import/Export module 108 is responsible for reading and writing settings values to a Removable Storage Devices 109 or a Cloud-Based Server 7 or another Vehicle/Implement System 8 via the Telematics Server 6.

Figure 2:
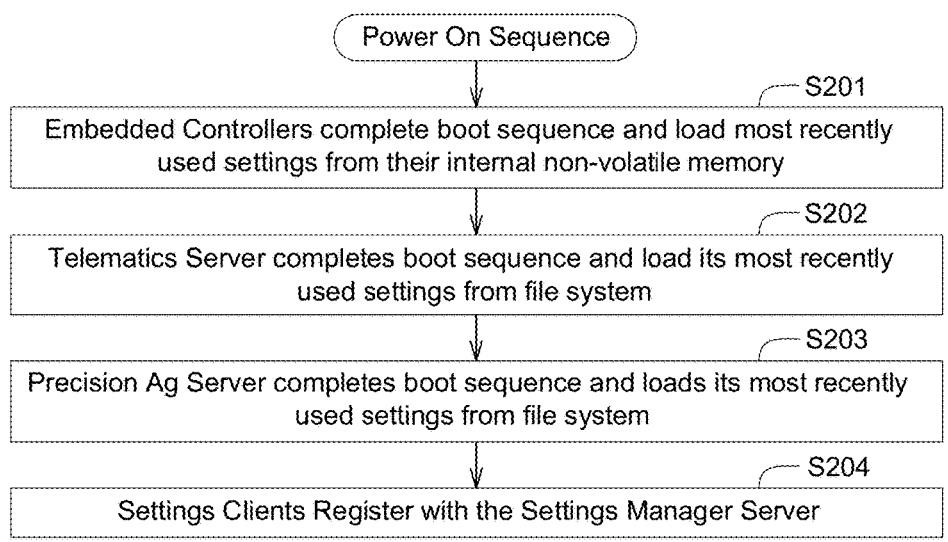
FIG. 2 is a flow chart of an example method of handling power up initialization of a distributed system for managing configurable settings.

FIG. 2 is a flow chart of an example method of initializing the configurable settings values of the components of a Vehicle/Implement System 1 after power is turned on (e.g. vehicle key to ON position). The method begins at step S201 in which the Embedded Systems 2, 3 will complete their boot up sequence and will initialize their configurable settings to the most recently used values that had been previously stored in their internal non-volatile memory.

In step S202, the Telematics Server 6 will complete its boot up sequence and will initialize its configurable settings to the most recently used values that had been previously stored in its internal file system.

In step S203, the Precision Ag Server 5 will complete its boot up sequence and will initialize its configurable settings to the most recently used values that had been previously stored in its internal file system. After this step, all of the configurable settings of all components of a Vehicle/Implement System 1 will have the same values that they had when the power was last turned off (vehicle key in OFF position).

In step S204, each Settings Client App 102, the Precision Ag Settings Client 104, and each Embedded System with Settings Client 3 will send a Registration Message, including a unique ID, to the Settings Manager Service 101. The Settings Manager Service 101 will include this unique ID when it saves settings for the client and use it to identify previously saved settings values for the client. This method provides the flexibility of a distributed system allowing Settings Clients 102, 104, 3 to be added and removed from the Settings Manager Service 101 to accommodate different Vehicle/Implement Systems or different models and options of the same system.

Figure 3:
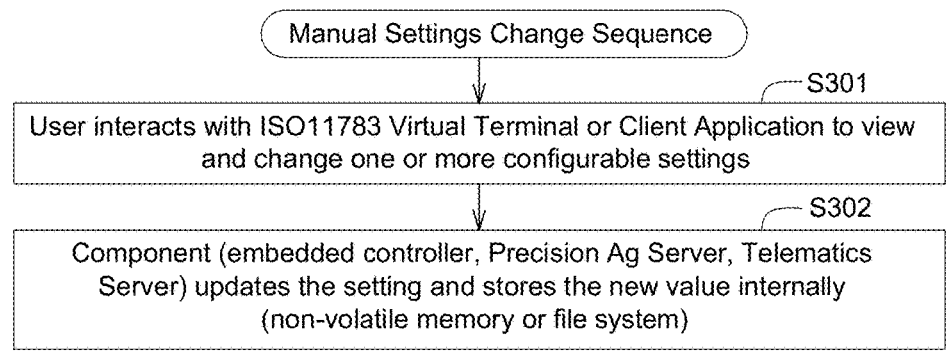
FIG. 3 is a flow chart of an example method of handling a user initiated change to a setting value.

FIG. 3 is a flow chart of an example method of handling user initiated changes to one or more configurable settings that are managed by an internal client application 3, 102, 104. The method begins at step S301 in which the user can interact with a user interface such as an ISO11783 Virtual Terminal 113 browser user interface (used for displaying a distributed user interface on behalf of a the Embedded Controller with Settings Client 3) or with a Settings Client App 102 user interface, either of which are shown on the Touch Screen Display 11, to view and make changes to configurable settings.

In step S302, the Embedded Controller with Settings Client 3 or Settings Manager Client App 102 (that had settings changes) may (or may not) store these settings, either in RAM or persist these settings in their own non-volatile memory and use these settings to modify their respective behaviors. The Settings Manager Service 101 is not involved in this step.

In step S302, the component that owns the changed configurable setting; Embedded System 2, 3, Precision Ag Server 5, or Telematics Server 6, will store a new value in its internal non-volatile memory. Note that the changed value is not saved by Settings Manager until commanded to do so by the user but the changed value will be restored after a key-off key-on power cycle (see FIG. 2)

Figure 4:
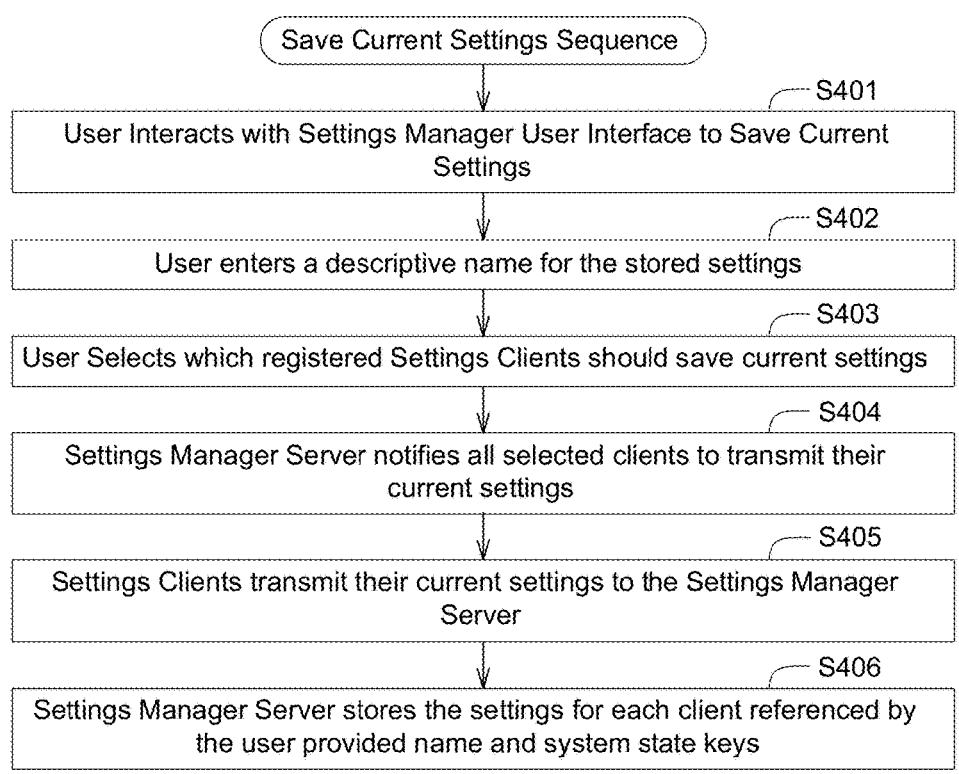
FIG. 4 is a flow chart of an example method of handling a user initiated request to save the current value of the vehicle/implement system settings.
Figure 8:
FIG. 8 is a diagram of an example user interface to allow the user to save settings or load previously saved settings.
Figure 9:
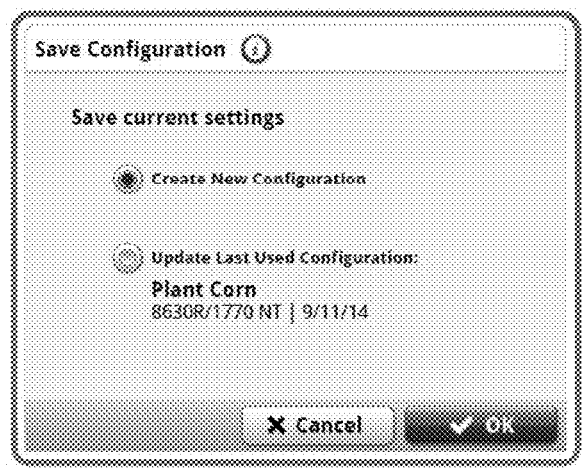
FIG. 9 is a diagram of an example user interface to allow the user to create a new collection of settings (Configuration) or update the last used Configuration.

FIG. 4 is a flow chart of an example method of saving a System Configuration 801 (FIG. 15) record that contains current values for all selected configurable settings. The method begins at step S401 in which the user interacts with the Settings Manager User Interface 107 on the Touch Screen Display 11 to save current settings. For example, the user navigates to the Settings Manager User Interface 107 then selects Save Current Settings (FIG. 8).

In step S402, the user is prompted to enter a Descriptive Name 808 for the collection of saved settings values (System Configuration 801). The descriptive name allows the user to later identify this particular collection of settings (e.g. "Planting hybrid XYZ beans").

Figure 10:
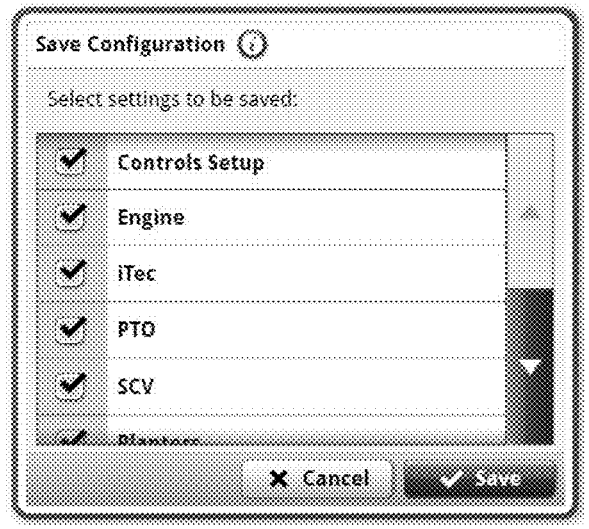
FIG. 10 is a diagram of an example user interface to allow the user to select the Settings Groups to be saved.

In step S403, the user is shown a list of all Settings Clients 3, 6, 102, 104 on the display 11 and allowed to select which settings to save (See FIG. 10 which shows an example of a screen for selecting from a list of Settings Group(s) 804 each of which is identified by their Settings Group Name 810).

In step S404, the Settings Manager Service 101 sends a notification to all selected Settings Clients 3, 6, 102, 104 requesting the selected clients to send their current settings values to the Settings Manager Service 101.

In step S405, Settings Clients 3, 6, 102, 104 send their current settings values to the Settings Manager Service 101.

In step S406, the Settings Manager Service 101 writes the settings values for each client to the Settings Store 106. These settings are stored as a System Configuration 801 record. This record contains one Settings Group Record 802 for each selected client Settings Group 804 corresponding to a Settings Client 3, 6, 102, 104 (See FIG. 16). The stored System Configuration 801 will include each Settings Client's Settings Group 804 with the Group's Unique ID 807 (see S204), the client's Group Name 808 (see S402), and the System Configuration 801 will contain the current System State Key 805 which is composed of a set of Key/Value Pair parameters that are provided by other Precision Ag Server 8 native software applications (e.g. vehicle SN, implement SN, crop type, conditions, etc.), as shown for example in FIG. 15.

Figure 5:
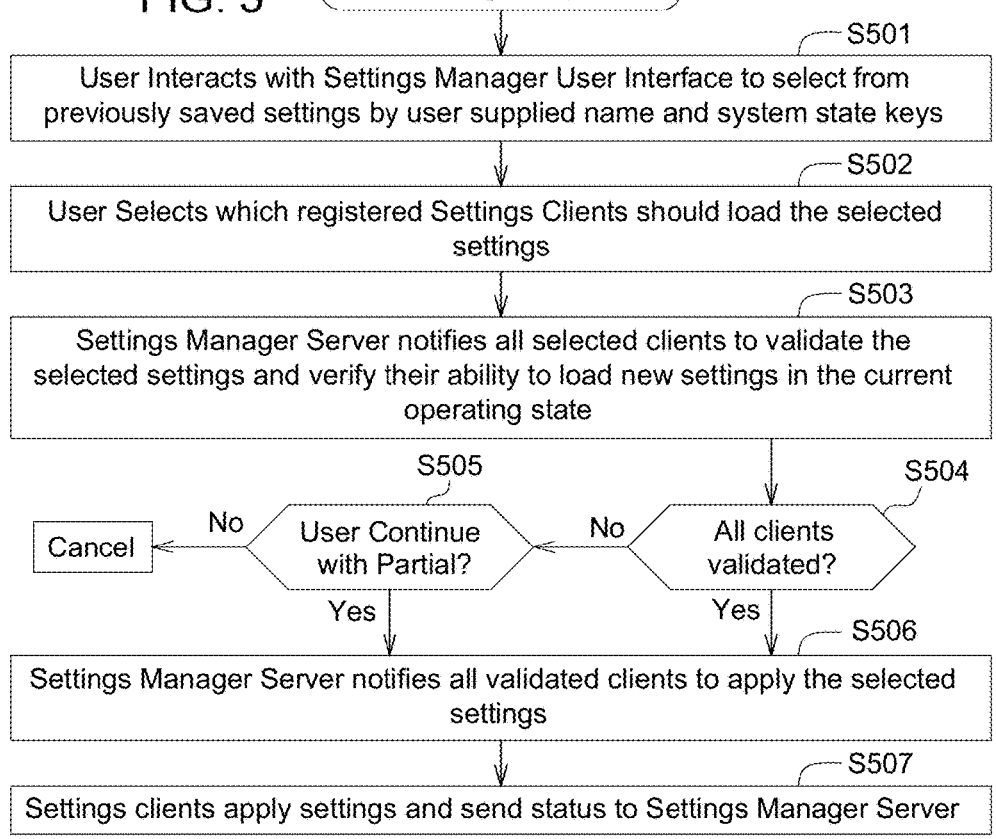
FIG. 5 is a flow chart of an example method of handling a user initiated request to change the current value of the vehicle/implement system settings to a previously saved set of values.

FIG. 5 is a flow chart of an example method of restoring the value of configurable settings from a previously saved collection of settings. The method begins at step S501 in which the user interacts with the Settings Manager User Interface 107 to select from a previously saved collection of System Configurations 801. The user selects from a list of configuration Descriptive Name(s) 808 (see S402). The System State Key 805 from each configuration may be used to sort or filter the list of System Configurations collection of System Configurations 801. FIG. 8 shows an example of a UI 11 for displaying a list of System Configurations (See S406).

Figure 11:
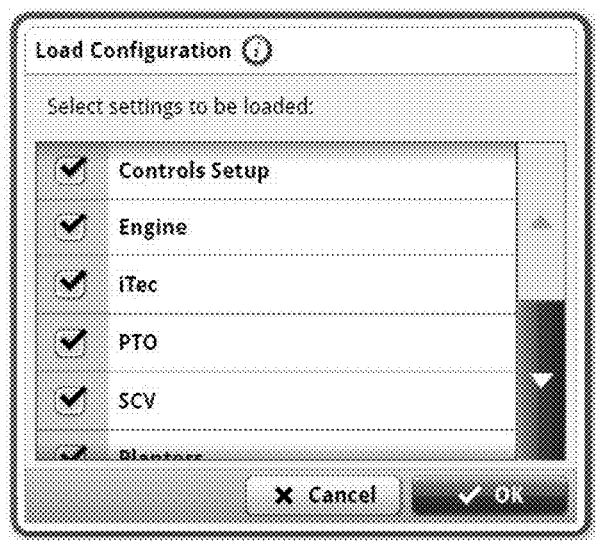
FIG. 11 is a diagram of an example user interface to allow the user to select the Settings Groups to be loaded.

In step S502, the user is shown a list on the display 11 of the Settings Clients 3, 6, 102, 104 that are included in the saved settings collection and allowed to select which Settings Clients 3, 6, 102, 104 should restore the saved settings. FIG. 11 shows an example of a UI 11 for selecting from a list of Settings Groups.

In step S503, the Settings Manager Service 101 sends a notification to all selected Settings Clients 3, 6, 102, 104 requesting them to verify their compatibility with the selected saved settings and to verify their ability to restore settings in the current operating state (e.g. moving, parked, engine off, etc.).

In step S504, the Settings Clients 3, 6, 102, 104 send a verification response to the Settings Manager Service 101 and if all Settings Clients 3, 6, 102, 104 respond with an affirmative, the process proceeds to step S506. If one or more Settings Clients 3, 6, 102, 104 responded with a negative, the process proceeds to step S505.

Figure 12:
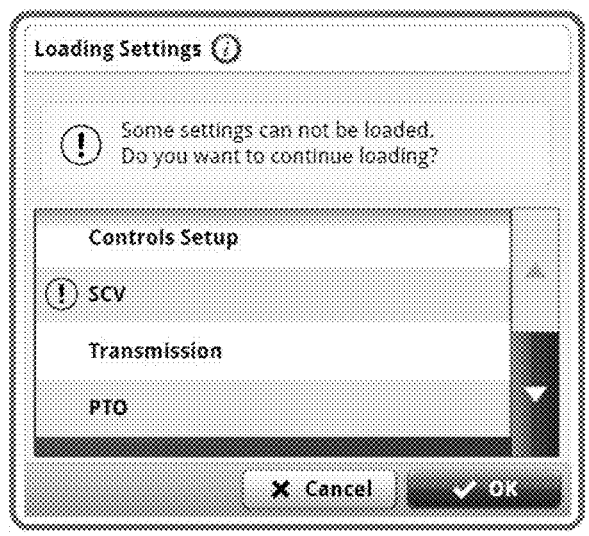
FIG. 12 is a diagram of an example user interface to notify the user that some settings groups cannot be loaded.
Figure 13:
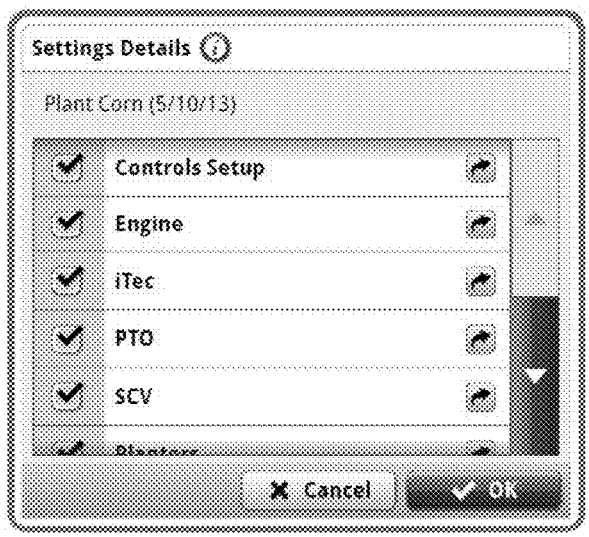
FIG. 13 is a diagram of an example user interface to allow the user to view the details of previously saved settings groups.
Figure 14:
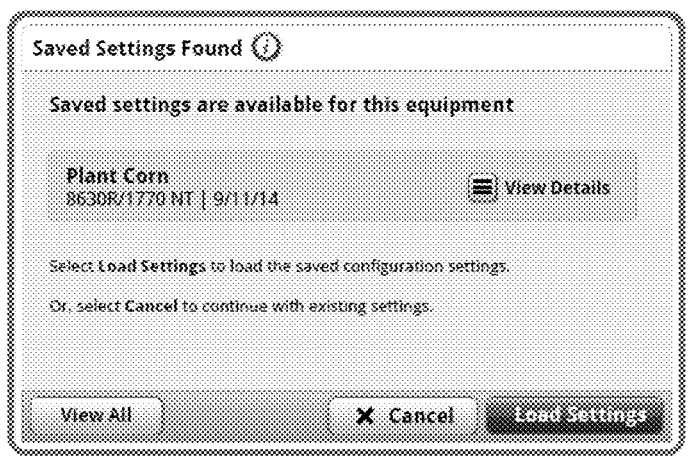
FIG. 14 is a diagram of an example user interface to notify the user when there previously saved settings matching the current system state keys and allow the user to load these settings.

In step S505, the user is shown which Settings Clients 3, 6, 102, 104 sent a negative verification response and provided with information about why they did so (See FIG. 12). If at least one Settings Client 3, 6, 102, 104 sent an affirmative verification response, the user is then asked if they wish to proceed with a partial restoration of settings values. If the user selects "Yes" (proceed with partial restoration) the process proceeds to step S506. If the user selects "No" then the sequence is aborted and no settings values are changed.

In step S506, the Settings Manager Service 101 sends a notification to all Settings Clients 3, 6, 102, 104 that responded with an affirmative verification, requesting them to apply the saved setting values.

In step S507, the Settings Clients 3, 6, 102, 104 that responded with an affirmative verification, apply the saved settings values, update their internal non-volatile memory or file systems, and send a status message indicating success or failure to the Settings Manager Service 101.

Figure 6:
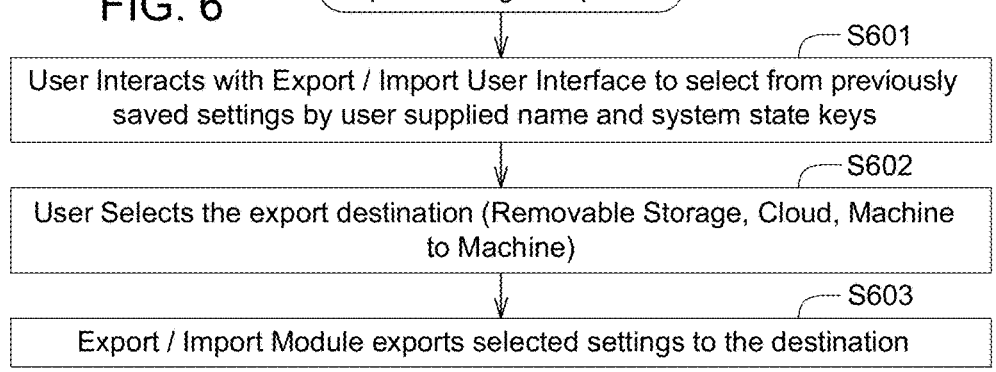
FIG. 6 is a flow chart of an example method of handling a user initiated request to export a previously saved set of settings values to removable storage or a cloud-based server or directly to another vehicle/implement system.

FIG. 6 is a flow chart of an example method of exporting previously saved collections of settings values for purposes of archiving or sharing with another Vehicle/Implement System 8. The method begins with step S601 in which the user interacts with the Export/Import user interface via the Settings Manager User Interface 107 to select from previously saved settings by the user provided name (see S402) and the saved values of the system state keys (see S406).

In step S602, the user interacts with the Export/Import user interface via the Settings Manager User Interface 107 to select an export destination (e.g. Removable Storage Device 109, Cloud-Based Server 7, or another Vehicle/Implement System 8)

In step S603, the Settings Import/Export Application 108 will receive the saved settings values from the Settings Manager Service 101 and send the settings values to the selected destination.

Figure 7:
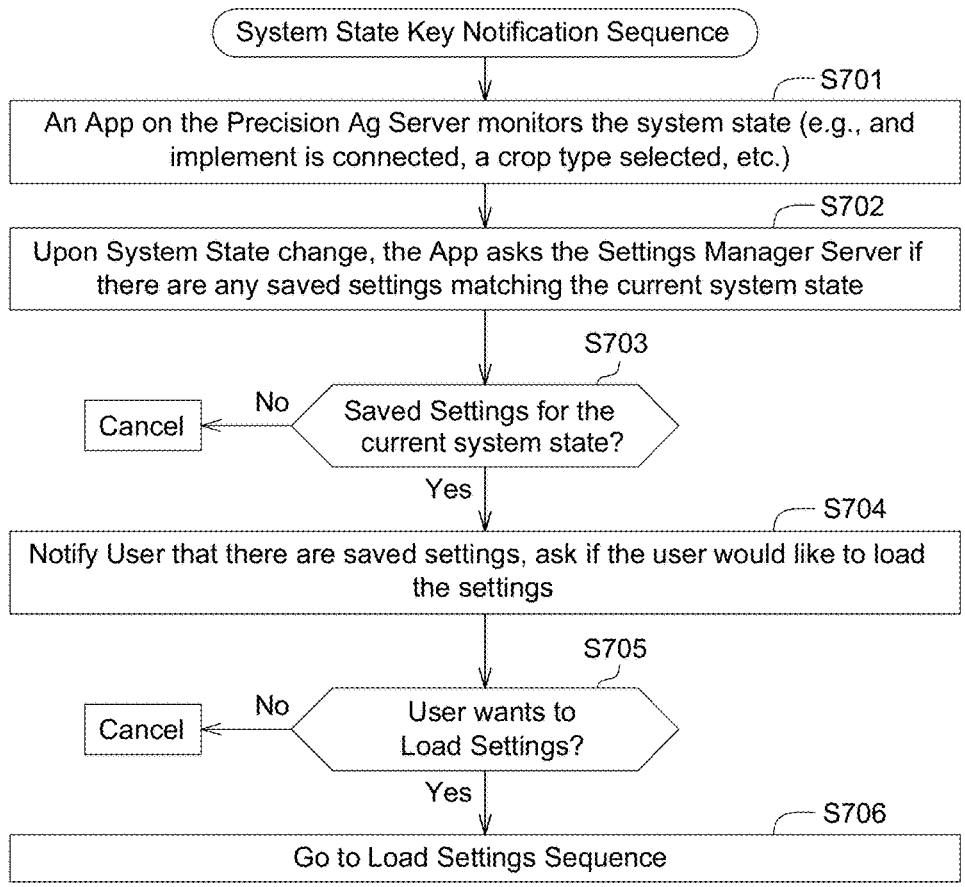
FIG. 7 is a flow chart of an example method of notifying a user that previously saved settings values exist for the current system state.

FIG. 7 is a flow chart of an example method of notifying a user that there are previously saved settings for the current System State Key 806 (e.g. vehicle SN, implement SN, crop type, conditions, etc.). The method begins at step S701 in which an application on the Precision Ag Server 5 monitors the current System State Key 806 (FIG. 15).

In step S702, upon change of a System State Key 806, the application sends a notification to the Settings Manager Service 101 asking if there are any saved settings collections that match the current System State Key 806.

In step S703, the Settings Manager Service 101 determines if there are saved System Configuration(s) 801 that matches the current System State Key 806. If there are one or more matches, the process continues to step S704. If there are no matches the sequence is aborted.

In step S704, the application notifies the user via the display 11 that there are saved settings for the current System State Key 806 and asks the user whether they would like to restore the previously saved System Configuration 801.

In step S705, if the user selects the option to load or select a System Configuration 801, the method proceeds to step S706. If the user declines the option to load previously saved System Configuration 801, the sequence is aborted.

In step S706, the sequence for restoring previously saved settings (see FIG. 5) is started for the System Configuration 801 that was selected in S705.

EXAMPLE

In the following example, it will be understood that a farmer has five fields A-E to plant with corn or soybeans using two tractors X and Z and two different planters Y and W. The equipment is also understood to have three groups of settings that include settings for a selective control valve (SCV), hitch and planter. The equipment will be setup into System 1 that includes Tractor X and Planter Y and System 2 that includes Tractor Z and Planter W.

In this example, the farming system needs to be setup with two System Configurations. The first System Configuration will be a configuration created by a user of the Vehicle/Implement System 1 for planting corn with a SCV setup for planting corn, a hitch setup for planting corn and a planter setup for planting corn. The second System Configuration will be a configuration created by a user of the Vehicle/Implement System 1 for planting soybeans with a SCV setup for planting soybeans, a hitch setup for planting soybeans and a planter setup for planting soybeans.

Figure 17A:
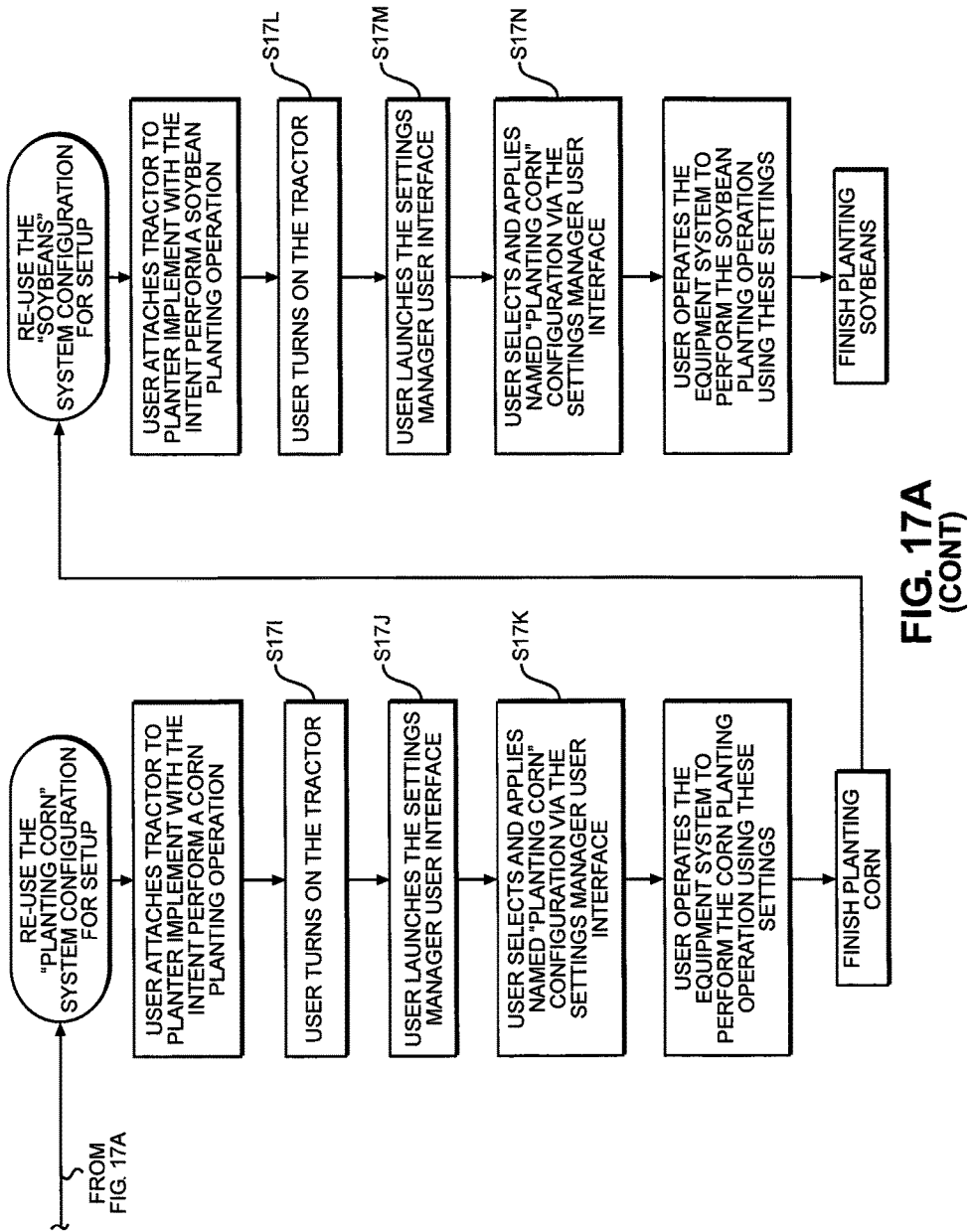
FIGS. 17A and 17B show an example of the Vehicle/Implement System being executed.

As shown in FIG. 17A, the user may attach planter Y to tractor X and then proceed to turn the tractor on at step S17A to execute the process shown in FIG. 2. At step S17B, the user may then proceed to adjust the tractor SCV settings, hitch settings and planter settings for planting corn via the user interface 11 according to the process of FIG. 3. At step S17C, the user may then launch the Settings Manager User Interface 107 and save the current settings for the system configuration at step S17D and provide it with a name (e.g., "Planting Corn") according to the process of FIG. 4. Using the newly created settings, the user then proceeds to plant field A with corn.

Upon completion of field A, the user may wish to plant field B with soybeans. Therefore, the user will attach planter Y to tractor X and then proceed to turn the tractor on at step S17E to execute the process shown in FIG. 2. The user may then proceed to adjust the tractor SCV settings, hitch settings and planter settings at step S17F for planting soybeans via the user interface 11 according to the process of FIG. 3. The user may then launch the Settings Manager User Interface 107 at step S17G and save the current settings for the system configuration at step S17H and provide it with a name (e.g., "Planting Soybeans"). Using the newly created settings, the user then proceeds to plant field B with soybeans.

Upon completion of planting field B, the user may then wish to plant field C with corn. The user will again attach planter Y to tractor X and turn the tractor on at step S17I to execute the process shown in FIG. 2. The user may then launch the Settings Manager User Interface 107 at step S17J and select the saved "Planting Corn" configuration at step S17K as provided in the process of FIG. 5. The user then proceeds to plant field C with corn.

Upon completion of planting field C, the user may then wish to plant field D with soybeans. The user will again attach planter Y to tractor X and turn the tractor on at step S17L to execute the process shown in FIG. 2. The user may then launch the Settings Manager User Interface 107 at step S17M and select the saved "Planting Soybeans" configuration at step S17N as provided in the process of FIG. 5. The user then proceeds to plant field D with soybeans.

Figure 17B:
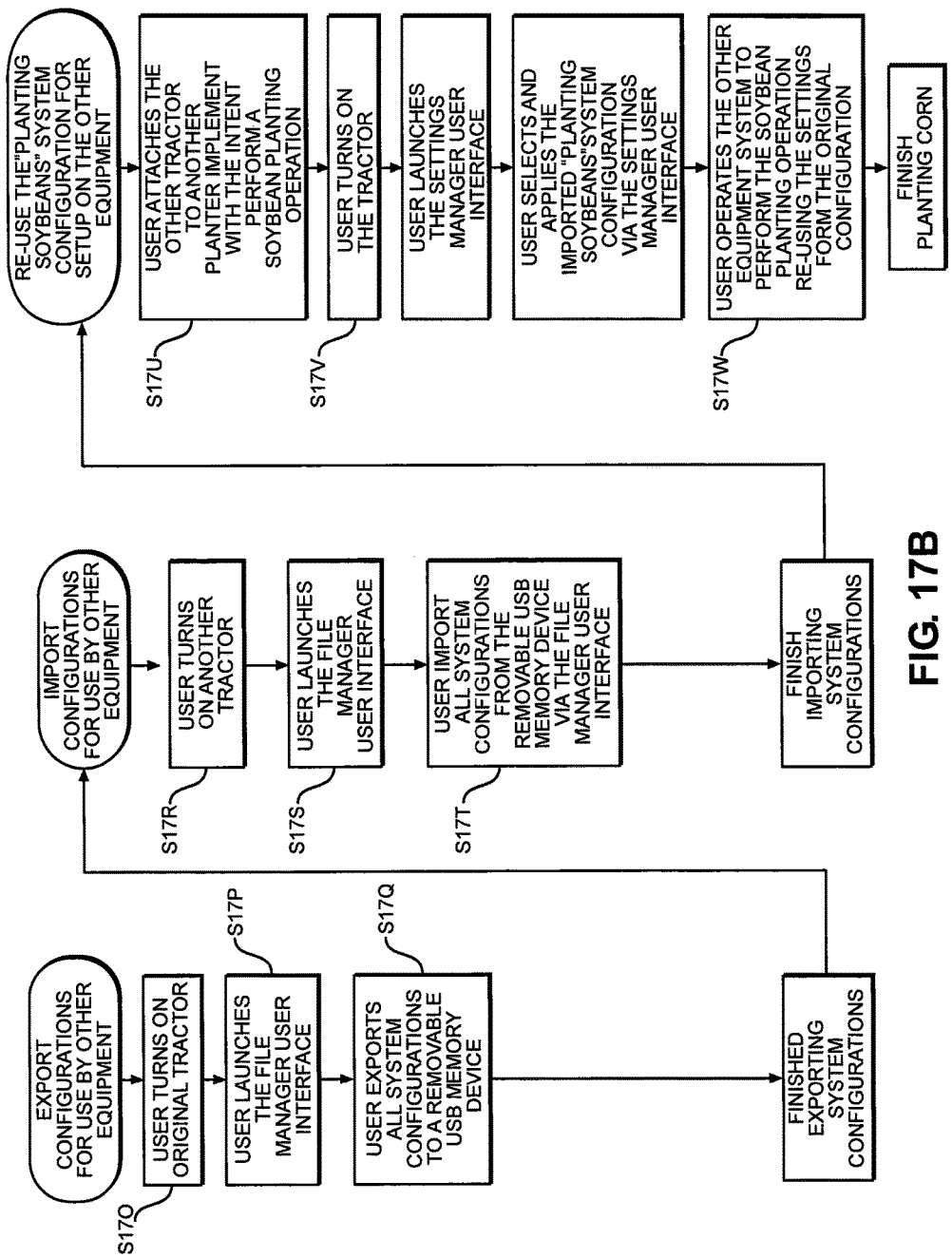

Upon completion of field D, the user may wish to plant field E tractor Z and planter W using a configuration already setup in tractor X for planter Y. Therefore, as shown in FIG. 17B the user can turn on tractor X at step S17O and launch the Settings Manager User interface 107 at step S17P and export one or more system configurations to a removable storage device 109 at step S17Q (such as a USB memory device) via the process shown at FIG. 6.

The user then turns on tractor Z at step S17R, launches the Settings Manager User interface 107 at step S17S to import one or more system configurations (e.g., "Planting Soybeans") from the removable storage device 109 at step S17T to the settings store 106 of tractor Z.

If tractor Z has been turned off, the user turns tractor Z on at step S17U. Once the desired configuration(s) is loaded onto the other vehicle implement system 8 of tractor Z, the user launches the Settings Manager User interface 107 at step S17V, and selects the and applies the "Planting Soybeans" configuration at step S17W. The user then operates tractor Z with planter W to plant soybeans in Field E according to the configuration set up in the vehicle/implement system 1 of tractor X.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of managing a collection of system configurations, the system including a vehicle, having a server with at least one processor and a memory, or the vehicle and an attached implement, the method comprising:
 launching a first user interface via a display of a vehicle/implement system mounted in the vehicle;
 selecting, via the first user interface, at least two user configurable settings from a list of available settings including a task to be performed by the vehicle or the vehicle and the attached implement; year of the vehicle or the year of the vehicle and the attached implement, model of the vehicle or the year of the vehicle and the attached implement, stored in the memory of the server that control operation of at least one of the vehicle or the vehicle and a first attachable implement via the first user interface;
 creating at least one named system configuration, via the first user interface, that contains current values for the selected user configurable settings;
 storing the at least one named system configuration in a data storage device;
 selecting, via the first user interface, a system configuration from the at least one named system configuration;
 applying at least one configurable setting from the selected named system configuration via a controller; and
 controlling operations of the vehicle or the vehicle and the first attachable implement via the at least one processor in accordance with the applied configurable setting.

2. The method of claim 1, further comprising:
 exporting the at least one named system configuration to another vehicle; and
 storing the at least one named system configuration in the another vehicle.

3. The method of claim 2, further comprising:
 launching a second user interface via a display mounted in the another vehicle;
 selecting a system configuration, via the second user interface, from among the at least one named system configuration stored in the another vehicle; and
 controlling the another vehicle or the another vehicle and a second attachable implement according to the named system configuration.

4. The method of claim 1, further comprising:
 selecting, via the first user interface, a group of configurable settings from the list of available settings stored in a memory that control operation of the vehicle and a third attachable implement via the first user interface;
 creating, via the first user interface, another system configuration that contains current values for all selected configurable settings;
 storing the another system configuration in the data storage device; and
 controlling the vehicle and the third attachable implement according to the another system configuration.

5. The method of claim 4, further comprising:
 exporting the another system configuration to the another vehicle;
 storing the another system configuration in the another vehicle.

6. The method of claim 3, further comprising:
 launching the second user interface mounted in the another vehicle;
 selecting the another system configuration from among the at least one system configuration stored in the another vehicle; and
 controlling the another vehicle and a fourth attachable implement according to the another system configuration.

7. The method of claim 2, wherein the exporting includes exporting the at least one system configuration from the data storage device to at least one of a removable storage device or a remote server wirelessly connected to the vehicle.

8. The method of claim 1, further comprising:
 verifying whether the selected system configuration is valid according to a current operating state of the vehicle and the first attachable implement.

9. The method of claim 3, further comprising:
 verifying whether the selected system configuration is compatible according to a current operating state of the another vehicle and the second attachable implement, and when at least one negative verification response is received, determining whether to proceed with a partial restoration of settings values.

10. The method of claim 1, wherein the selecting of the named system configuration from the list of available settings includes a configuration that best matches the current state of the system.

11. A controller for controlling a vehicle/implement system, the controller comprising:
 a memory storing computer-readable instructions; and
 one or more processors configured to execute the computer-readable instructions such that the one or more processors are configured to
 execute selection of at two least user configurable settings from a list of available settings including the task to be performed by the vehicle or the vehicle and the attached implement; year of the vehicle or the year of the vehicle and the attached implement, model of the vehicle or the year of the vehicle and the attached implement, stored in the memory that control operation of a vehicle or the vehicle and a first attachable implement received via a first user interface;
 create, via a user interface of the vehicle, at least one named system configuration that contains current values for all selected configurable settings;
 store the at least one named system configuration in a data storage device;
 execute selection of a system configuration from the at least one named system configuration received via the first user interface;
 apply at least one configurable setting from the selected system via the user interface; and
 control operation of the vehicle or the vehicle and the first attachable implement via the vehicle/implement system in accordance with the selected system configuration.

* * * * *